United States Patent
Cocchini et al.

(10) Patent No.: US 10,546,089 B1
(45) Date of Patent: Jan. 28, 2020

(54) POWER PLANE SHAPE OPTIMIZATION WITHIN A CIRCUIT BOARD

(71) Applicant: INTERNATIONAL BUSINESS MACHINES CORPORATION, Armonk, NY (US)

(72) Inventors: Matteo Cocchini, Long Island City, NY (US); Edward N. Cohen, Poughkeepsie, NY (US); Nicholas G. Danyluk, Long Island City, NY (US); Zachary T. Dreiss, Beacon, NY (US); John S. Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/050,131

(22) Filed: Jul. 31, 2018

(51) Int. Cl.
*G06F 17/50* (2006.01)
(52) U.S. Cl.
CPC ...... *G06F 17/5068* (2013.01); *G06F 2217/12* (2013.01)
(58) Field of Classification Search
USPC .......................................................... 716/137
See application file for complete search history.

(56) References Cited

U.S. PATENT DOCUMENTS

| | | | |
|---|---|---|---|
| 5,736,796 A | 4/1998 | Price et al. | |
| 6,084,779 A | 7/2000 | Fang | |
| 6,480,989 B2 | 11/2002 | Chan et al. | |
| 6,846,992 B2 | 1/2005 | Amparan et al. | |
| 7,065,721 B2 | 6/2006 | Pekin et al. | |
| 7,124,390 B2 | 10/2006 | Smith et al. | |

(Continued)

FOREIGN PATENT DOCUMENTS

WO 2009/002301 A1 12/2008

OTHER PUBLICATIONS

Pedram et al., "Power Optimization in VLSI Layout: A Survey". Retrieved from the Internet URL: <https://pdfs.semanticscholar.org/fdbf/9c51c0e0073bad94011414ebf47a7bad51cf.pdf>, 1997, VLSI Signal Processing (30 pages).

(Continued)

*Primary Examiner* — Suresh Memula
(74) *Attorney, Agent, or Firm* — Teddi Maranzano, Esq.; Kevin P. Radigan, Esq.; Heslin Rothenberg Farley & Mesiti P.C.

(57) ABSTRACT

Fabrication of a circuit board is facilitated by automatically determining an optimized power plane shape for a power plane of the circuit board, including ascertaining for the power plane a source location(s) and a sink location(s), where the source supplies power to the sink across the power plane. A center of current density is determined for the power plane shape, and a respective power plane sub-shape is incrementally generated between the center of current density and each source and sink location to, in part, supply a desired operational voltage from the source location(s) to the sink location(s) across the power plane. The respective power plane sub-shapes are combined into the optimized power plane shape. Further, the process includes initiating fabricating of the circuit board using, at least in part, the optimized power plane shape to provide the power plane shape within the circuit board.

20 Claims, 15 Drawing Sheets

(56) References Cited

U.S. PATENT DOCUMENTS

| | | | |
|---|---|---|---|
| 7,386,822 B1* | 6/2008 | Hu | G06F 17/5072 |
| | | | 257/E27.108 |
| 7,752,578 B2 | 7/2010 | Allen et al. | |
| 8,464,200 B1* | 6/2013 | Christo | G06F 17/5068 |
| | | | 716/132 |
| 8,572,541 B2 | 10/2013 | Singh et al. | |
| 8,631,381 B2 | 1/2014 | Dai et al. | |
| 2003/0188271 A1* | 10/2003 | Zhuang | G06F 17/5045 |
| | | | 716/113 |
| 2003/0223208 A1 | 12/2003 | Wu et al. | |
| 2004/0268277 A1* | 12/2004 | Francom | G06F 17/5036 |
| | | | 716/111 |
| 2008/0059919 A1* | 3/2008 | Harrer | H05K 1/0265 |
| | | | 716/120 |
| 2008/0295041 A1* | 11/2008 | Zhou | G06F 17/5068 |
| | | | 716/132 |
| 2009/0199140 A1* | 8/2009 | Kariat | G06F 17/5036 |
| | | | 716/106 |
| 2010/0023903 A1* | 1/2010 | Pramono | G06F 17/5036 |
| | | | 716/106 |
| 2010/0030513 A1 | 2/2010 | Tsai | |
| 2013/0212550 A1* | 8/2013 | Christo | G06F 17/5081 |
| | | | 716/133 |
| 2015/0324507 A1* | 11/2015 | Takami | G06F 17/5081 |
| | | | 716/107 |

OTHER PUBLICATIONS

Mel et al., "The NIST Definition of Cloud Computing," National Institute of Standards and Technology, Information Technology Laboratory, Special Publication 800-145, Sep. 2011, (pp. 1-7).

* cited by examiner

POWER PLANE SHAPE OPTIMIZATION WITHIN A CIRCUIT BOARD

BACKGROUND

Printed circuit boards (PCBs), which form the backbone of most electronic devices and systems, are manufactured to route electrical signals through circuit paths and power planes within the board. Today, most printed circuit board wiring is formed of copper pathways which route electricity through the board. Extensive effort has focused on strategic PCB component placement, and high-speed auto-routing algorithms, sometimes at the detriment of optimizing power plane layout for the board. Typically, after structure placement and wiring is completed for the circuit board, the power plane is manually drawn, and electronic design automation (EDA) tools are used to give graphical loss feedback on the plane that is then interpreted to determine how the power plane shape can be redrawn to possibly improve performance. This process has resulted in power plane assemblies that have added costs due to increased number of board layers, and inefficient use of power domain layers. In addition to cost, underutilized copper and added power layers can degrade PCB assembly signal integrity performance due to noise susceptibility and thicker via structures, which introduce impedance discontinuities.

SUMMARY

Certain shortcomings of the prior art are overcome and additional advantages are provided through the provision of a method of fabricating a circuit board. The method includes automatically determining an optimized power plane shape for a power plane of the circuit board. The automatically determining includes: ascertaining for the power plane at least one source location and at least one sink location, the at least one source location to supply power to the at least one sink location across the power plane; determining for the power plane a center of current density for the at least one source location to supply power to the at least one sink location; incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane; and combining the respective power plane sub-shapes into the optimized power plane shape. Further, the method includes initiating fabricating of the circuit board using, at least in part, the optimized power plane shape to provide the optimized power plane shape within the circuit board.

In a further aspect, a system for facilitating fabricating a circuit board is provided. The system includes a memory, and a processor communicatively coupled to the memory. The system performs a method including automatically determining an optimized power plane shape for a power plane of the circuit board. The automatically determining includes: ascertaining for the power plane at least one source location and at least one sink location, the at least one source location to supply power to the at least one sink location across the power plane; determining for the power plane a center of current density for the at least one source location to supply power to the at least one sink location; incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane; and combining the respective power plane sub-shapes into the optimized power plane shape. Further, the method includes initiating fabricating of the circuit board using, at least in part, the optimized power plane shape to provide the optimized power plane shape within the circuit board.

In a further aspect, a computer program product is provided for facilitating fabricating of a circuit board. The computer program product includes a computer readable storage medium having program instructions embodied therewith. The program instructions are executable by one or more computer systems to cause the one or more computer systems to automatically determine an optimized power plane shape for a power plane of the circuit board. The automatically determining includes: ascertaining for the power plane at least one source location and at least one sink location, the at least one source location to supply power to the at least one sink location across the power plane; determining for the power plane a center of current density for the at least one source location to supply power to the at least one sink location; incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane; and combining the respective power plane sub-shapes into the optimized power plane shape. Further, the program instructions are executable by the one or more computer systems to cause the one or more computer systems to initiate fabricating of the circuit board using, at least in part, the optimized power plane shape to provide the optimized power plane shape within the circuit board.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
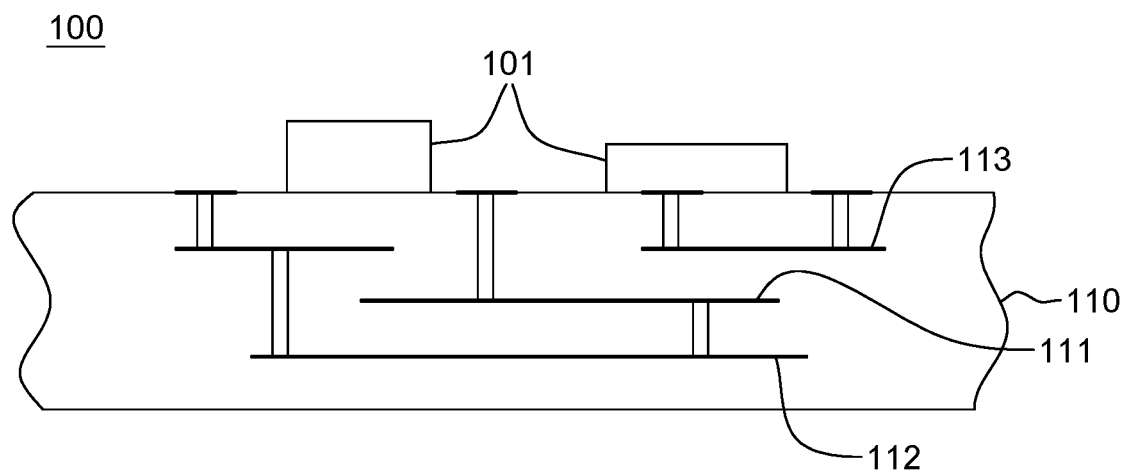
FIG. 1 is a cross-sectional elevational view of one embodiment of a multilayer circuit board to include an optimized power plane shape, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, fabricating a circuit board with one or more optimized power plane shapes, in accordance with one or more aspects of the present invention.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative evaluation control embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As known, printed circuit boards, or more generally circuit boards, mechanically support and electrically connect electronic components and/or electrical components using conductive lines, paths, and other features etched from one or more sheet layers of, for instance, copper laminated onto and/or between sheet layers of a nonconductive substrate. Components are then attached, for instance, by soldering, onto the printed circuit board to both electrically connect and mechanically fasten the components to the board. A basic circuit board may include a flat sheet of insulating material and a layer of copper foil, laminated to the substrate. Chemical etching divides the copper into separate conductive lines, traces, pads for connections, vias to pass connections between layers of copper, etc. A circuit board design may have many copper layers. A multilayer circuit board sandwiches additional copper layers between layers of insulating material. Conductors on different layers are connected with vias, which can be copper plated holes that function as electrical tunnels through the insulating substrate. Through-hole component leads also sometimes function as vias.

Often, multiple layers are dedicated as power supply and ground planes. Depending on the implementation, there may be one or more power domains and a number of power supply planes, or power planes, within the circuit board. Typically, the power and ground plane shapes are wider than signal traces. For instance, in one or more embodiments of a multilayer circuit board, an entire layer may be mostly solid copper to act as a ground plane for both shielding and power return. Additionally, the power plane(s) may be designed, in one or more implementations, as a rectangular shaped conductor plane sized to supply power, for instance, from a source location on the power plane to one or more sink locations.

Modern circuit boards may be designed with a dedicated layout tool or software, generally in the following steps: a schematic capture through an electronic design automation (EDA) tool occurs, card dimensions and template are decided based on required circuitry and case of the circuit board, positions of the components and heat sinks are determined, and a layer stack of the circuit board is decided. Location of ground and power planes are decided. A power plane is the counterpart to the ground plane and behaves as an AC signal ground while providing DC power to the circuits mounted on the printed circuit board. Signal interconnections are traced on signal planes. Signal planes can be on the outer as well as inner layers, line impedance is determined using dielectric layer thickness, routing copper thickness and trace width. Components are placed, and thermal considerations and geometry are taken into account, including vias and lands being marked. Signal traces are routed, and electronic design automation tools typically create clearances and connections in power and ground planes automatically. Gerber files are then generated for manufacturing the resultant circuit board design. As is well known, a variety of processes are used during the fabrication of a circuit board including, for instance, subtractive, additive and semi-additive processes, chemical etching, lamination, drilling, plating and coating, solder resist application and assembly of the resultant circuit board.

Extensive effort has focused on strategic printed circuit board (PCB) component placement in high-speed autorouting algorithms, sometimes at the determent of a power plane shape or layout. Typically, after placement and often wiring is completed, power plane shapes are created using, for instance, manual graphical methods where experienced physical designers estimate what shape will meet the desired loss performance targets. After power shapes are drawn, electronic design automation (EDA) tools can be used to give graphical loss feedback that must be manually interpreted to determine how shapes can be iteratively redrawn to improve performance. This contemporary design methodology can be a time consuming process that requires a lot of manual input and/or intervention that can result in circuit board assemblies that have added costs due to an increased number of board layers, and in the case where an EDA is not used, superfluous copper. In addition to cost, added power layers may degrade circuit board assembly signal integrity performance due to noise susceptibility, and thicker via structures which introduce impedance discontinuities.

By way of example only, FIG. 1 depicts one embodiment of a circuit board, such as a printed circuit board assembly 100 which includes, along with a multilayer circuit board 110, one or more electronic components 101 operatively coupled to a surface of circuit board 110. Within circuit board 110, one or more power plane layers 111 are provided, as well as one or more ground planes 112. Further, multilayer circuit board 110 includes one or more signal trace layers 113 for interconnecting and electrically routing signals between, for instance, electronic components 101 attached to the board.

Figure 2A:
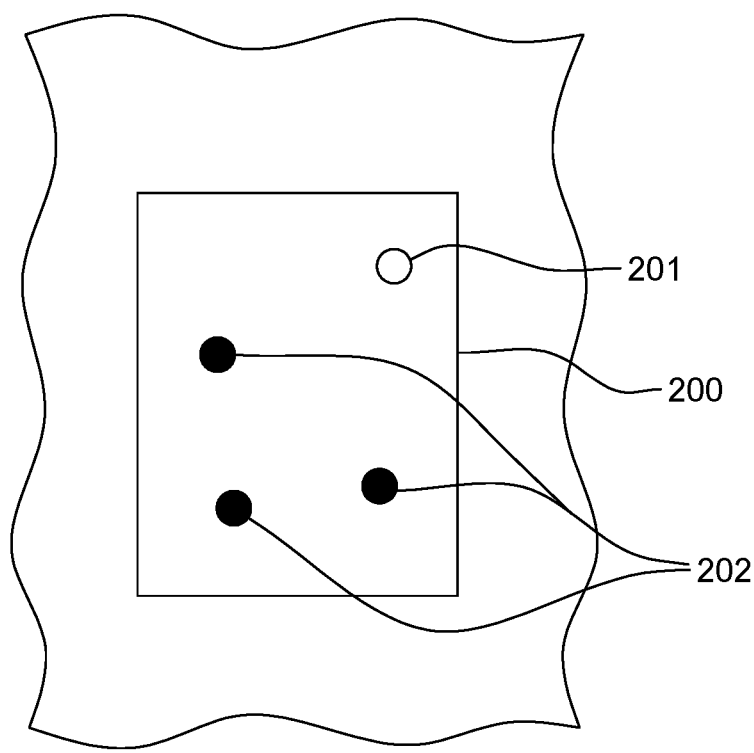
FIG. 2A is a plan view of one embodiment of a circuit board with a conventional power plane shape.

As explained herein, aspects of the present invention are directed to providing automated logic for determining an optimized power plane shape(s) to, for instance, increase the availability of metal regions for other power domains. For instance, FIG. 2A depicts an example of a typical, estimated, power plane shape 200 in the form of a rectangle, where power is distributed from a source location 201 to multiple sink locations 202. As noted above, such a design approach can disadvantageously result in circuit board assemblies that have added cost due to superfluous copper and an increased number of board layers.

Figure 2B:
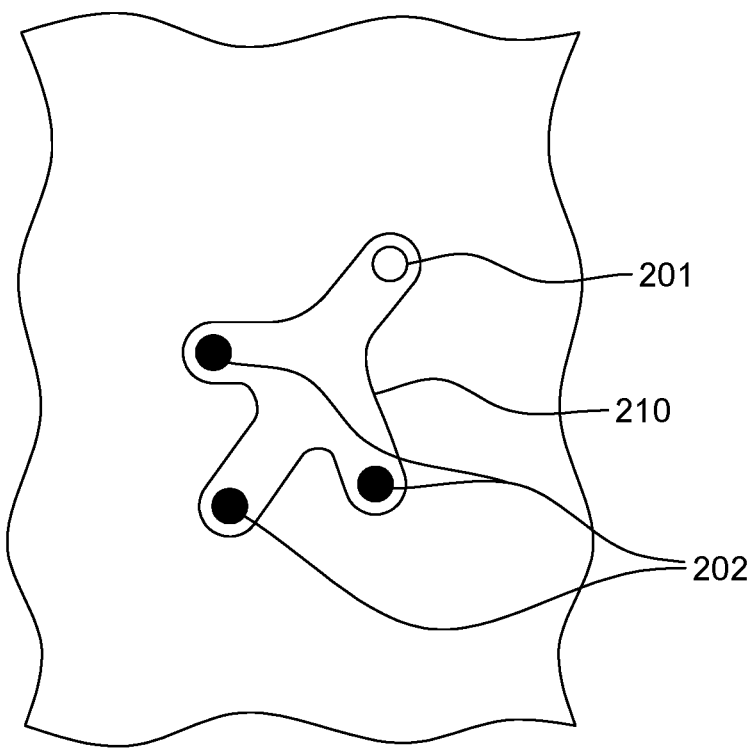
FIG. 2B is a plan view of one embodiment of a circuit board with an optimized power plane shape, in accordance with one or more aspects of the present invention.

In accordance with aspects of the present invention, the current density distribution for a source of energy to multiple sinks of current is established, and based on that, a shape that includes a majority of the charge is produced so as to minimize the voltage drop, and metal utilization in providing an optimized power plane shape. FIG. 2B depicts an example of a resultant power plane shape produced by optimization logic according to aspects of the present invention. As illustrated in the optimal power plane shape of FIG. 2B, less metal (for instance, copper) is utilized in the resultant power plane to deliver or distribute the desired voltage. As explained herein, the logic presented identifies points of charge convergence given a certain distribution of current sinks, and includes an iterative method of adding small sections of copper (or more generally, small geometric shapes) that are routed between the charge convergence and the source/sink locations around known obstacles, or specified structures, to generate a full power shape that, based on the layout process, is optimized for distribution of a specified power. Advantageously, circuit board development and manufacture benefits from an intelligent, automated power shape generation process as described herein that factors in component power consumption, power supply infusion points, and known obstacles, such as voids, board edges, etc. Substantial design and manufacturing time and cost savings can be realized using the processes disclosed herein. In one or more implementations, the power plane shape design processing could be implemented as a standalone tool or program, or added to a feature of existing printed circuit board design program or electronic design automation (EDA) tool to facilitate design and subsequent fabrication of the circuit board.

By way of example, certain embodiments are described herein using 0.5 mΩ rectangles (or squares) of copper as the geometric shape for incrementally constructing a power plane shape in a power distribution layer of a circuit board. Note in this regard that two copper rectangles may be different in area, yet each have approximately the same 0.5 mΩ resistance, assuming that they are the same thickness (e.g., 1.2 mils). The resistance of each rectangle is not based on absolute size, but on the ratio between the voltage between two edges of the rectangle and the current that flows in between. If the same voltage is used, the current in a smaller rectangle may be half the current in a larger rectangle such that both rectangles provide 0.5 mΩ of resistance to the electrons moving through the rectangles. As explained further herein, the aspects discussed below can vary the size of, for instance, a geometric shape, such as a 0.5 mΩ rectangle or square, and combine different sized geometric shapes to form optimized power plane shapes on or within the circuit board.

Generally stated, disclosed herein are methods, systems and computer program products for facilitating fabricating a circuit board with one or more optimized power plane shapes within the circuit board. The processes include automatically determining an optimized power plane shape for a power plane of the circuit board by: ascertaining for the power plane at least one source location and at least one sink location, the at least one source location to supply power to the at least one sink location across the power plane; determining for the power plane a center of current density for the at least one source location to supply power to the at least one sink location; incrementally generating a respective power plane shape between the center of current density and each source location of the at least one source location and between the center of current density and each source location of the at least one sink location to, at least in part, supply a desired operational voltage level from the at least one source location to the at least one sink location across the power plane; and combining the respective power plane shapes into the optimized power plane shape. The process further includes initiating fabricating of the circuit board using, at least in part, the optimized power plane shape to provide the optimized power plane shape within the circuit board.

In one or more embodiments, the incrementally generating includes for a particular power plane sub-shape, incrementally laying out the power plane sub-shape as a plurality of interconnected conductive units of a particular geometric shape. In one or more embodiments, the incrementally laying out includes determining a number of conductive units of the particular geometric shape, and a size of the conductive units of the particular geometric shape based, at least in part, on a desired resistance for the power plane sub-shape. The determining of the center of current density may further include determining required voltage at the center of current density based on allowable voltage drop between the center of current density and the at least one sink location.

In one or more embodiments, incrementally generating the respective power plane sub-shapes includes determining for a particular power plane sub-shape that the power plane sub-shape would interfere with a specified structure of the circuit board, and based thereon, routing the particular power plane sub-shape around the specified structure by incrementally stepping the particular power plane sub-shape around the specified structure. The routing of the particular power plane sub-shape may include splitting the power plane sub-shape into two power plane paths wrapping around opposite sides of the specified structure, and the incrementally generating can include incrementally stepping each power plane path around a respective side of the specified structure of the circuit board.

In one or more implementations, the number of conductive units of the particular geometric shape and/or the size of the conductive units of the particular geometric shape vary between different power plane sub-shapes based, at least in part, on location of one or more specified structures of the circuit board interfering with the incrementally generating of one or more of the different power plane sub-shapes.

In one or more embodiments, the combining can include ascertaining an overlap volume between the respective power plane sub-shapes when combined, and using the overlap volume to curve one or more edges of the combined power plane sub-shapes to obtain the optimized power plane shape. For instance, using the overlap volume can include curving the one or more edges of the combined power plane sub-shape in a webbed pattern around the center of current density of the power plane.

Figure 3:
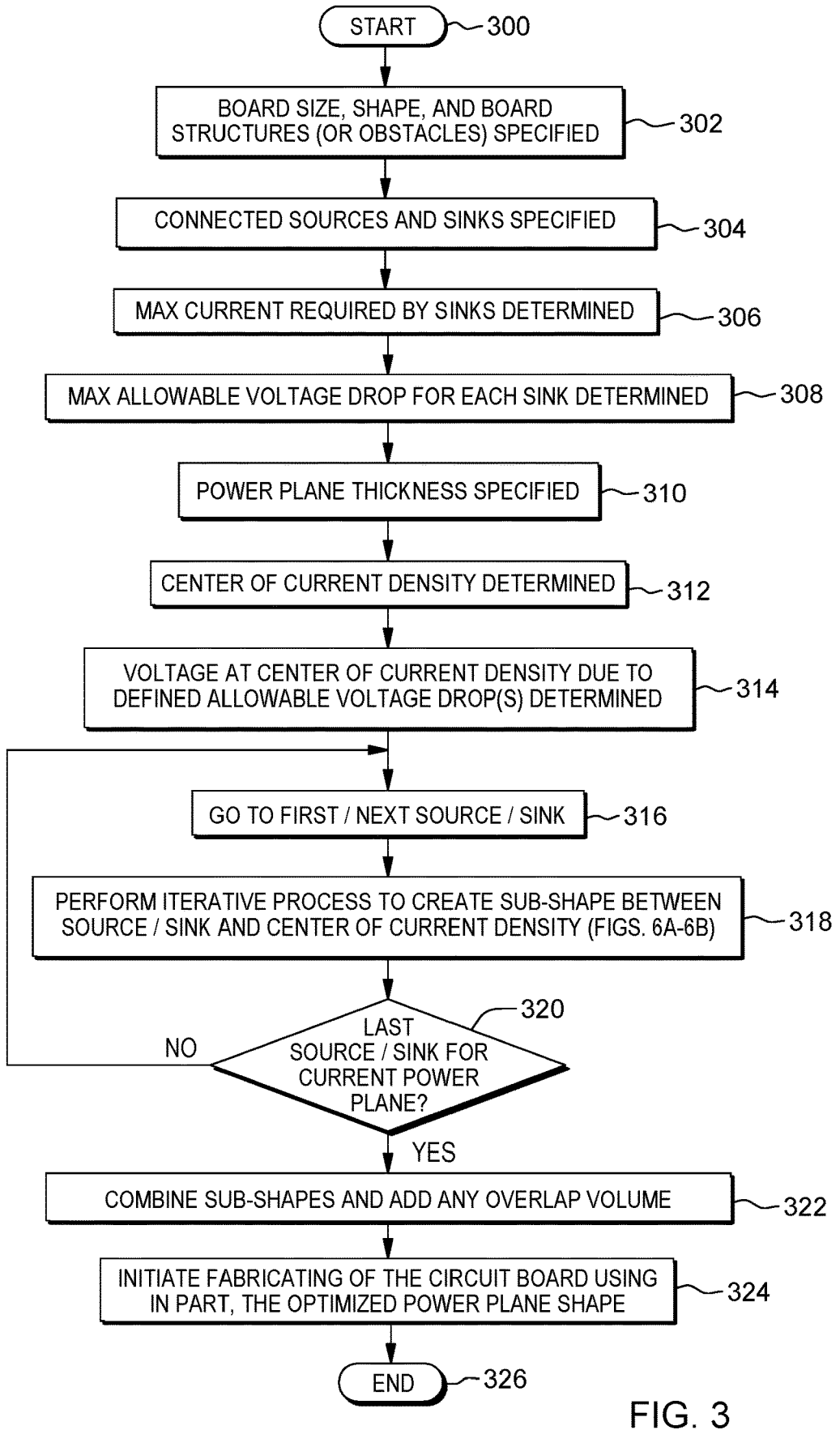
FIG. 3 depicts one embodiment of logic for determining an optimized power plane shape, in accordance with one or more aspects of the present invention.

By way of example, FIG. 3 depicts one embodiment of logic for determining an optimized power plane shape, in accordance with one or more aspects of the present invention. As illustrated, the process starts 300 with the board size, shape and board structures (or obstacles) being specified or determined 302. The board structures or obstacles may be voids, such as portions of a board that are non-existent, such as mounting holes, areas of known component placement (e.g., connectors, processors, integrated circuits (ICs), etc.), pads or anti-pads, or keep-out areas, etc. The locations of the sources and sinks are specified or determined 304. Note that a source location could be a source of voltage that powers or provides energy to one or more other locations or components (i.e., sink locations). The maximum current required by the sinks is determined 306. Processing determines the maximum allowable voltage drop to each sink based, for instance, on the voltage and current requirements of the sink location 308. The power plane thickness is specified or determined 310, which is the intended power plane thickness for the layer of the circuit board that contains the power plane shape. The center of current density is determined 312, which is the location where the largest distribution of current converges. Various methods may be used to determine the point where a charge converges (e.g., gaussian distribution). Note also that there may be multiple centers of current density, and the process described could be performed using the center of largest current density (by way of example).

Figure 4:
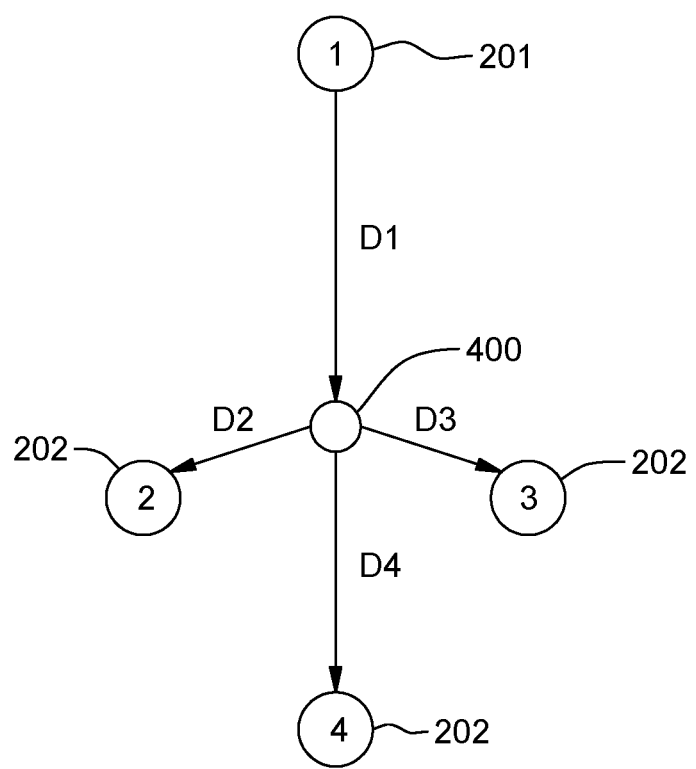
FIG. 4 depicts one embodiment of source and sink connection locations, as well as a center of current density, for a power plane to connect the source and sink locations, in accordance with one or more aspects of the present invention.

The logic determines the voltage at the center of current density due, for instance, to a defined allowable voltage drop(s) 314. One method to determine the required voltage at the center of current density is to determine a ratio of how far the center of current density is along the total path for the longest source to sink distance. For instance, in the example of FIG. 4, the longest distance between the source and sink is D1+D4. If D1=6 cm, and D4=4 cm, 60% of the allowable voltage drop between the two points would occur over D1 (e.g., if source 1=12 volts and the allowable voltage drop to sink 4 is 2% (12×0.02=0.24V). The voltage at the center of current density would then be set to 11.76V for all sub-shape determinations. Note that in the example of FIG. 4, reference 201 refers to a source location, and, reference 202, to sink locations, with location 400 being the center of current density being determined, and distances D1-D4 being the respective distances between or to the center of current density and the source/sink.

Another method to determine the voltage at the center of current density is to deduct half of the allowable voltage for the most restricting sink from the source to the center of current density, and the other half from the center of current density to the sink. For instance, if sinks 2 & 3 in FIG. 4 could tolerate a 0.5 V drop, but sink 4 could only tolerate a 0.2 V drop, 50% of the 0.2 V would be used, and the center of current density voltage would be set 0.1V below the source voltage.

Figure 6A:
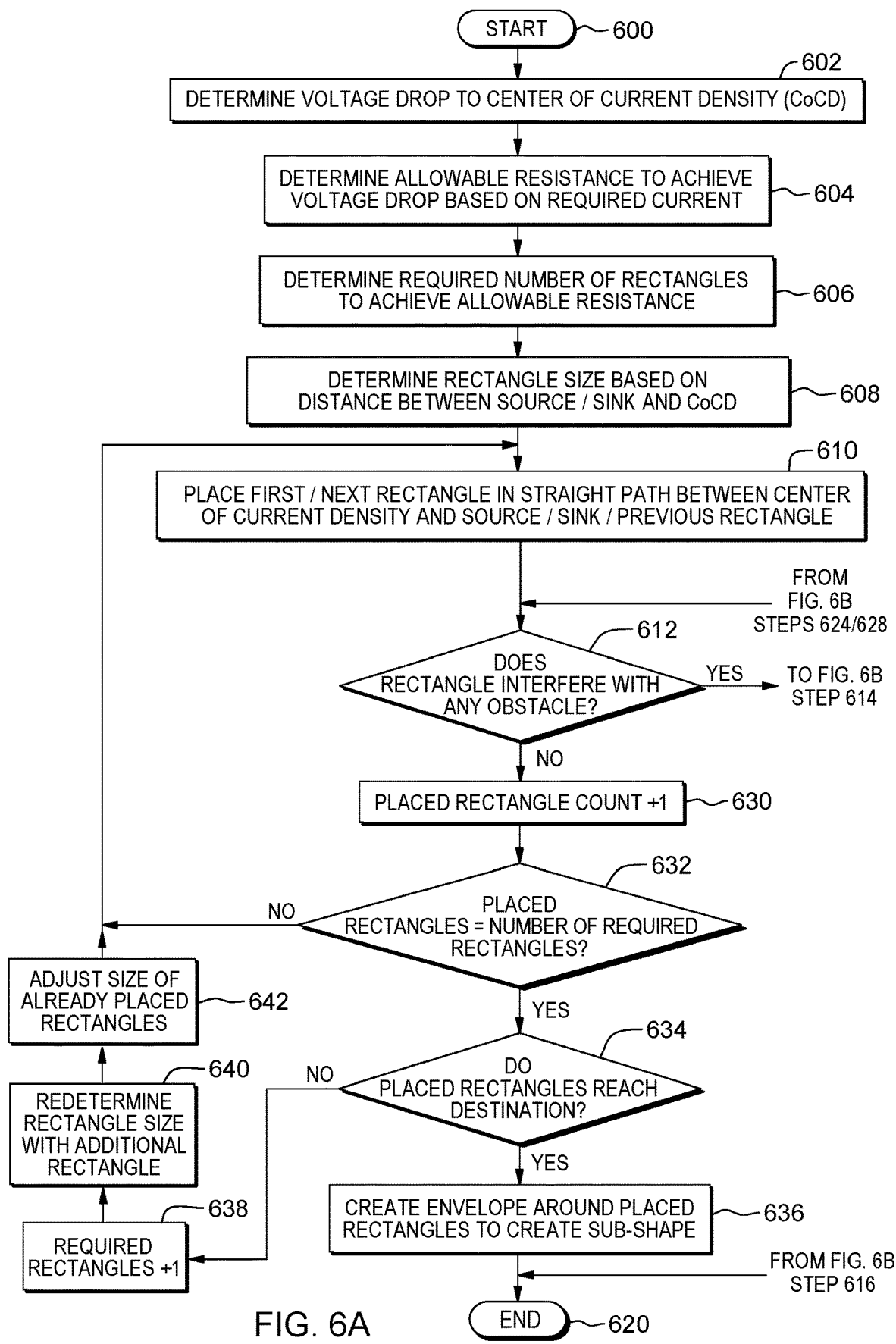
FIGS. 6A-6B depict one embodiment of logic for incrementally generating a respective power plane sub-shape, in accordance with one or more aspects of the present invention.
Figure 6B:
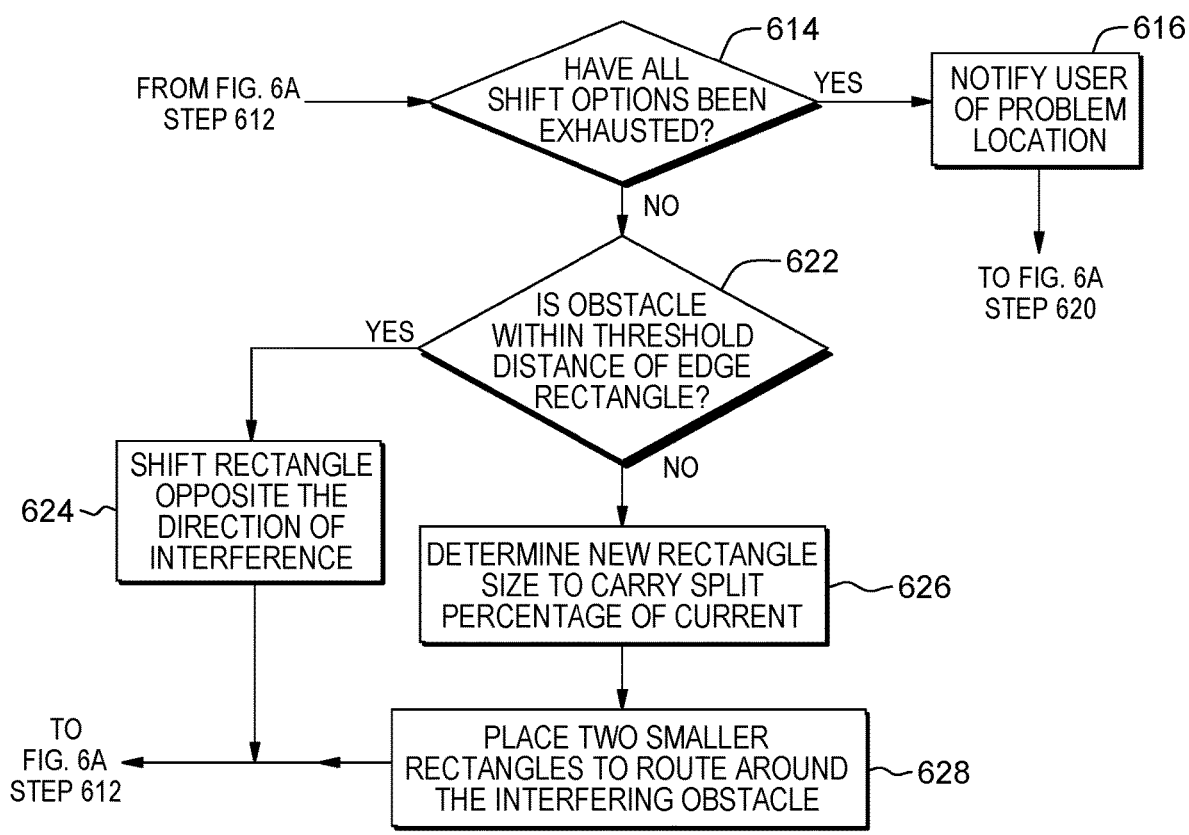

Continuing with the logic of FIG. 3, a first or next source or sink location relative to center of current density is chosen 316, and an iterative process is performed to create sub-shapes between that source or sink and the center of current density 318. One embodiment of this process is depicted in FIGS. 6A-6B, and described further below. Note that the process can go in any order through the sources and sinks, that is, in any order through the source to center of current density or center of current density to sink pairings. In one or more embodiments, the process may begin with any source or sink to center of current density sub-shape that interferes in a straight line with a specified structure or obstacle on the board. Once the last source or sink for the power plane shape has been processed 320, then the power plane sub-shapes are combined, and any overlap volume between the respective power plane sub-shapes is determined and redistributed 322, before initiating fabricating of the circuit board using, in part, the optimized power plane shape 324, which completes the process 326.

Figure 5A:
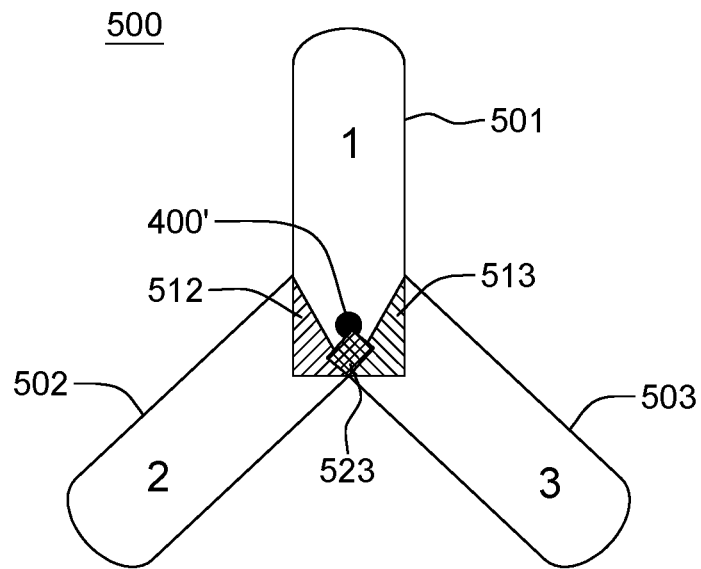
FIG. 5A depicts respective power plane sub-shapes, and shows an overlap volume resulting from combining the power plane sub-shapes, in accordance with one or more aspects of the present invention.
Figure 5B:
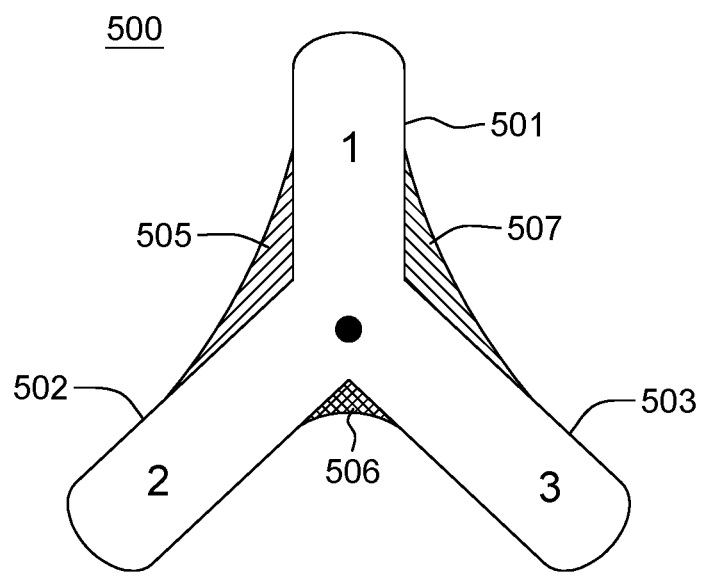
FIG. 5B depicts the combined power plane sub-shapes of FIG. 5A with multiple edges of the power plane curved in a webbed pattern around the center of current density to produce the optimized power plane shape, in accordance with one or more aspects of the present invention.

FIGS. 5A & 5B depict one embodiment of the process for ascertaining an overlap volume, and redistributing that volume. As shown in FIG. 5A, three power plane sub-shapes 501, 502, 503 are combined to create a power plane shape 500, with a center of current density 400'. In the combined sub-shapes, overlap volumes 512, 513 & 523 are shown. When combining sub-shapes, this overlap volume may be determined and added, as shown in FIG. 5B (in one or more embodiments), in a webbed pattern 505, 506, 507 around center of current density 400', along one or more edges of the shape and between the overlapping sub-shapes in order to curve the edges of the shape. The final optimized power plane shape is the combination of the initial determined sub-shapes, and this redistributed conductive volume or webbing around the center of current density. The final optimized power plane shape is an optimal shape for power distribution in the printed circuit board design being fabricated, and also minimizes the amount of conductive material required for the power plane shape.

As noted, FIGS. 6A-6B depict one embodiment of logic for generating a respective power plane sub-shape, in accordance with one or more aspects of the present invention. The processing starts 600 with determining the voltage drop between the center of current density and the source location at issue or between the center of current density and the sink location at issue using, for instance, the maximum allowable voltage drop specified previously 602. The allowable resistance to achieve the voltage drop based on the required current is determined 604, and the determined resistance is used to determine the required number of rectangles (or more generally, geometric shapes) to achieve the allowable resistance 606. As noted, in one or more embodiments, the rectangles can be 0.5 mΩ copper rectangles or squares. Note that fractional results can be rounded down such that the voltage drop stays below the maximal allowable drop specified. Further, note that although copper rectangles and/or squares are discussed herein, the processing described applies to any conductive material, and to a variety of geometric shapes, such as non-rectangular shapes. Further, note that although 0.5 mΩ rectangles are described, rectangles of a different resistance may also be utilized as the conductive units. For instance, changing the thickness of the copper plane, or changing the material from copper to another metal, will change the resistance, but the process disclosed herein remains applicable. Based on the number of rectangles, the size of each rectangle (length and width) can be determined based on the distance between the center of current density and the source/sink 608. Note that this process assumes that the rectangle can in fact be a square, or more generally, a rectangular geometric shape. For each sub-shape, an iterative process is used to place the rectangles in a straight path from the source to the center of current density, and from the center of current density to each sink, or from a previously placed square to its destination. In particular, the first/next rectangle is placed in a straight line path between the center of current density and the source/sink/previous rectangle 610.

Processing determines whether the next placed rectangle in the straight line path interferes with an obstacle or specified structure of the circuit board 612. If "no", then a counter of placed rectangles is incremented 630, and processing determines whether the number of placed rectangles is equal to the number of required rectangles 632. If "no", then processing loops back to place the next rectangle 610. Assuming that the number of rectangles or geometric shapes has been reached, then processing determines whether the placed rectangles reach the destination location 634. If the placed rectangles do not reach the destination, then the number of rectangles is increased 638. This will likely occur if obstacles existed between the center of current density and the source/sink location. The necessity to route the rectangles or geometric shape about an obstacle increases the total routing distance, making the previously determined rectangle size insufficient to complete the full path.

Next, the rectangle size is re-determined based on the addition of the rectangle 640. An example of this is described further below with reference to FIG. 7B. A rectangle the same size cannot simply be added because each rectangle is 0.5 mΩ, and the rectangles were sized based on the specified voltage drop, current, and distance. An excess rectangle of the same size would increase the resistance leading to a voltage drop that exceeds the maximum allowable voltage drop specified. Thus, a new distance would need to be determined to ascertain rectangle size based on the already placed shifted rectangles. Note, in one or more embodiments, that this step is optional. In another embodiment, the step can be skipped and the logic can re-determine the rectangle size due to the longer distance; that is, the new rectangle size would be larger but still be 0.5 mΩ in resistance so as to not exceed the voltage drop specification.

The size of rectangles that were already placed are adjusted, but can follow the same envelope to minimize the required calculations that would otherwise be needed if the entire sub-shape was redrawn 642. Note that an alternative approach could be to erase all placed rectangles, and start at the beginning using the new rectangle size and number of rectangles, with a resulting path that varies slightly from the original path. The processing then loops back to place the next rectangle, with the size adjustment 610. Returning to inquiry 612, and as shown in FIG. 6B, if a rectangle placed in a straight path does interfere with an obstacle or specified structure of the circuit board, then processing first determines if all shift options have been exhausted 614. For instance, processing determines if a left shift, right shift, or split path were already analyzed and deemed unsuccessful. If all shift options have been exhausted, then a user can be notified that an optimized shape in the current position on the current layer is not possible 616, and the process can end 620 (FIG. 6A). The notification can indicate for the user to change the layer that the shape resides on, use vias to move part of the sub-shape to another layer of the board, move components if possible, or that a more unusual shape is required to deliver the desired voltage and current.

Assuming that all shift options have not yet been exhausted on the current rectangle, then logic may analyze the obstacle to determine if it is within a threshold distance or edge of the rectangle on either side 622. For instance, the threshold distance might be 25% of the width of the rectangle. This action can be tracked such that if there is another interference after the shift is performed, the logic will know to try a different shift on the next path. If an obstacle is within the threshold distance of the edge of the rectangle, then the rectangle may be shifted in the direction opposite to the obstacle to a point where there is no more interference 624. The method then loops back to reanalyze the new rectangle position to see if the new rectangle caused any new interferences 612 (FIG. 6A).

If the obstacle is not within a threshold distance of the edge of the rectangle, then logic may choose to split the current into multiple paths around the obstacle. By providing multiple paths, the current will be split between the paths creating lower current in each path, and creating a need for rectangles of lower resistance. This can include determining a new rectangle size to carry the split percentage of current 626, and the placing of two smaller rectangles to route around the interfering obstacle 628. The processing then loops back to reanalyze the new rectangle positions to see if the shift caused any new interferences 612 (FIG. 6A).

Splitting the sub-shape into multiple current paths can begin by attempting to split the current in half on each side of the obstacle, creating the need, for instance, for two 0.25 mΩ rectangles. The exact size of the 0.25 mΩ rectangle can be determined in a similar manner to the original size determination, with the distance approximated by the interfering object's size. If a 0.25 mΩ rectangle interferes with another obstacle, the percentage of the current that goes on either side of the obstacle can be altered, creating different sized rectangle on each side of the obstacle to carry different amounts of current. For instance, 40% of the current could be carried on the left side, requiring 0.2 mΩ rectangles, and 60% on the right side, requiring 0.3 mΩ rectangles. The new 0.25 mΩ rectangles can be split further, such that another path is created around a new obstacle, if desired. If the length of the paths are uneven, the size, and therefore the resistance, can be altered such that the longer side has less resistance, proportional to the speed at which the electrons will travel through the material. Processing can go back in the process to rectangles that were placed just before the split was required to split those rectangles such that the overall sub-shape is smoother at the end. Each group of rectangles in a split-path scenario can be counted as one in the placed rectangle count. Note that this step is optional and, in another embodiment, the step may be skipped and larger 0.25 mΩ copper rectangles (or squares) can be used for the reduced current in the path so as to not exceed the voltage drop specifications.

Once it is determined that the placed rectangles reach the destination, that is, the source/sink location, an envelope can be created around the rectangles such that a smooth sub-shape is created 636 (FIG. 6A), before the processing ends 620 and returns to the main processing flow of, for instance, FIG. 3. An envelope is used because sharp edges are undesirable, and could create undesired effects due to the path of electron movement. For envelopes created around an object, the method ensures that any additional copper added does not increase the overall resistance to the point where the voltage drop exceeds the maximum allowed. Providing the envelope can include (for instance) filling the area around sources/sinks/center of current densities with a circular shape centered on the source/sink/center of current density with a diameter equal to the size of the determined rectangle.

Figure 7B:
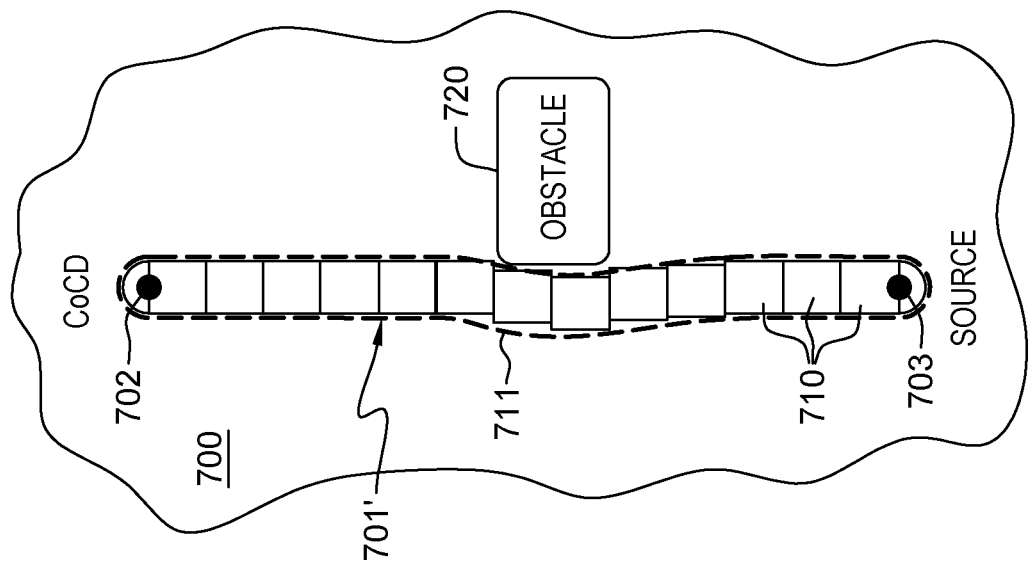
FIG. 7B depicts another example of an incrementally generated power plane sub-shape, in accordance with one or more aspects of the present invention.
Figure 7A:
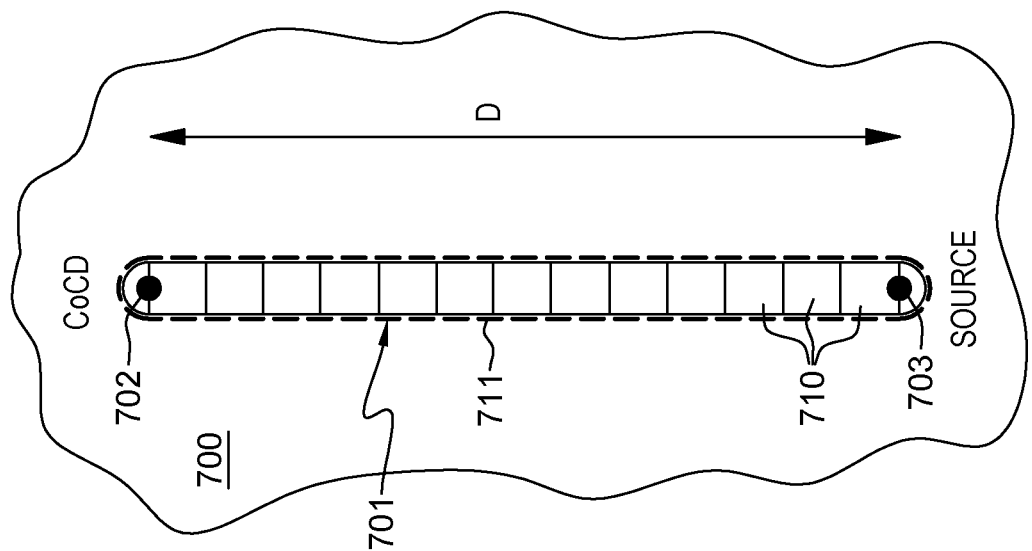
FIG. 7A depicts one example of an incrementally generated power plane sub-shape, in accordance with one or more aspects of the present invention.

FIGS. 7A-9D depict various examples of determining a power plane sub-shape, in accordance with the logic of FIGS. 6A-6B, and the description provided herein. In FIG. 7A, an example of a power plane sub-shape 701 is provided for a circuit board 700 between a center of current density (COCD) 702 and a source location 703. As shown, multiple geometric shapes, such as rectangles 710, are incrementally generated and placed in this example in a straight line, with distance 'D' representing the distance between the center of current density 702 and the source location 703. Upon completion, an envelope 711 is provided around the assembled rectangles 710.

As a specific example, where there are no obstacles, assume that a copper rectangle or square thickness is one ounce, or 1.2 mils, which equals 0.003048 cm. The rectangle resistance is 0.5 mΩ, and distance D is 10 cm. Further, current (I) is 3 A, and voltage (V) equals 1 V at the source, with the maximum voltage drop $V_{drop}$=2% (20 mV). With this example, the resistance equals 6.6 mΩ, and the number of rectangles can be determined from 6.6 mΩ divided by 0.5 mΩ as 13 rectangles. In the case of a square, the square side length equals D divided by the number of rectangles, or 0.769 cm per square in this example. This will achieve the exact voltage drop that is the limit. For practical considerations, the shape can be made a little wider, so instead of a square, a rectangle with 0.769 cm height could be used, with the base a little larger than that so as not to be at the voltage drop limit. Alternatively, the method can be employed with a voltage drop slightly less than what is actually required, in order to provide a margin.

FIG. 7B depicts a similar example to that of FIG. 7A, only, with an obstacle 720, which the incremental generating of the power plane sub-shape 701 routes around. The copper thickness, resistance, distance D, current, voltage, and maximum voltage drop are similar to that example described in FIG. 7A. Because the alteration to the routing does not add additional length, the same number of rectangles (i.e., 13 rectangles) and rectangle size can advantageously be used by the incremental generating process in this example.

Figure 8B:
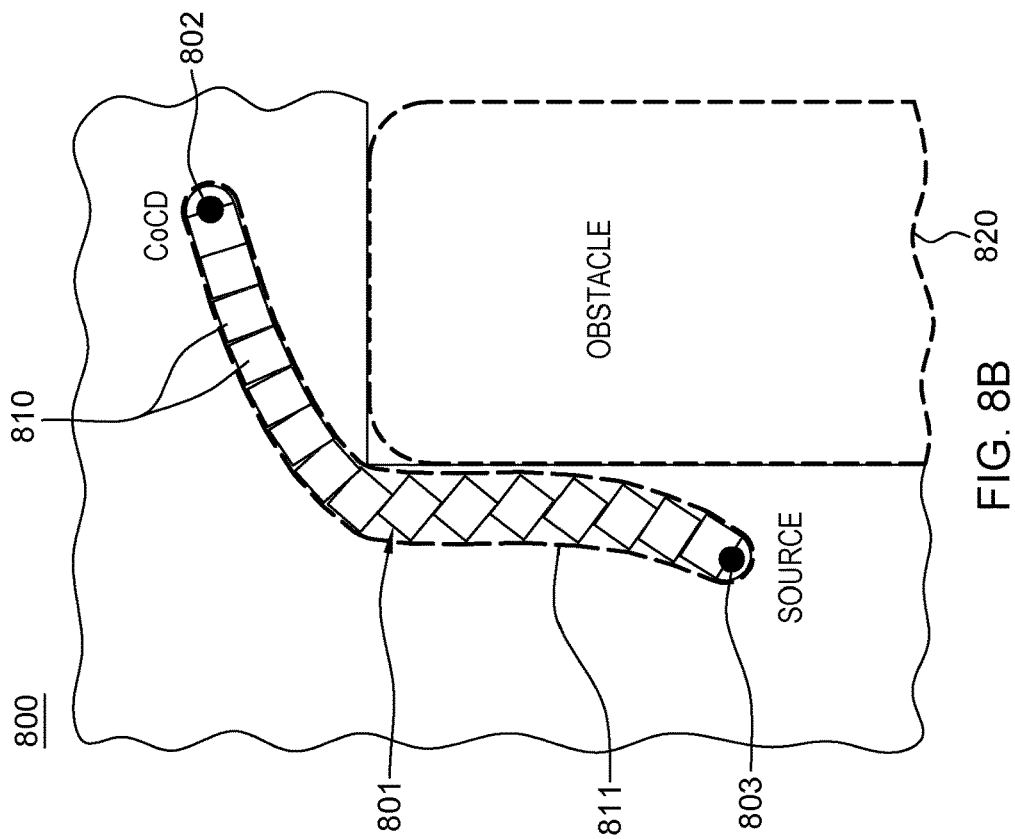
FIG. 8A-8C depict an example of incrementally generating a power plane sub-shape in the presence of a specified structure (or obstacle) in a straight-line path between the center of current density and a source (or sink) location, in accordance with one or more aspects of the present invention.
Figure 8A:
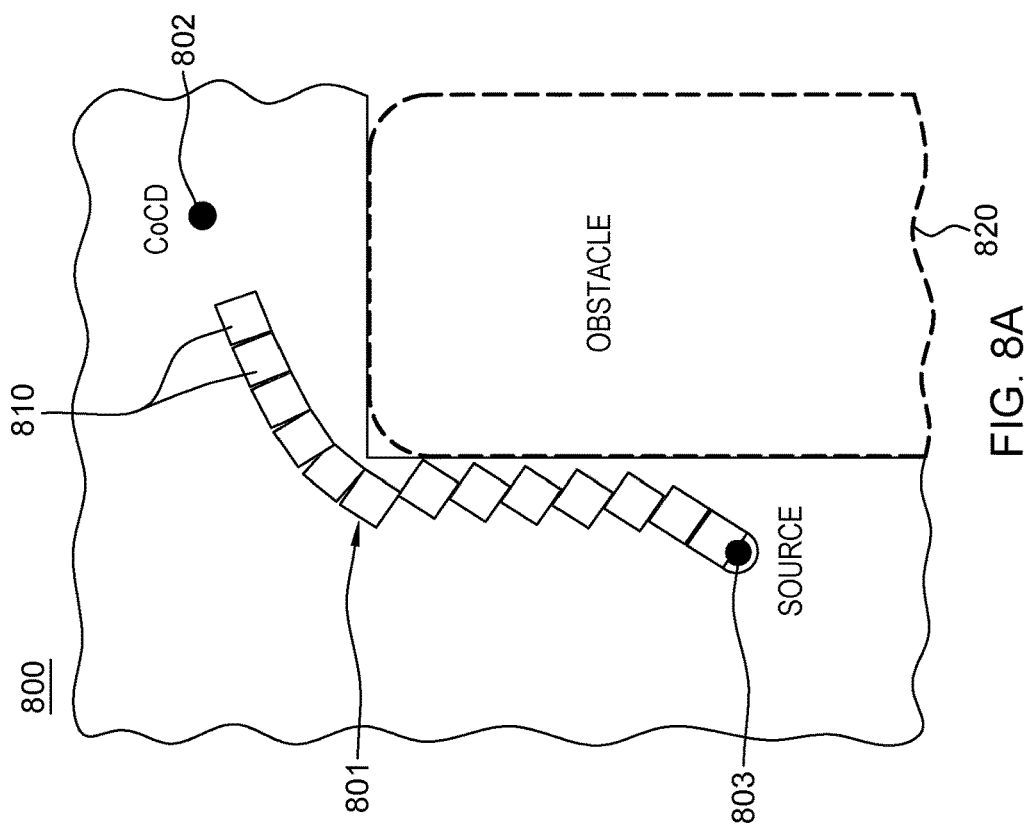
Figure 8C:
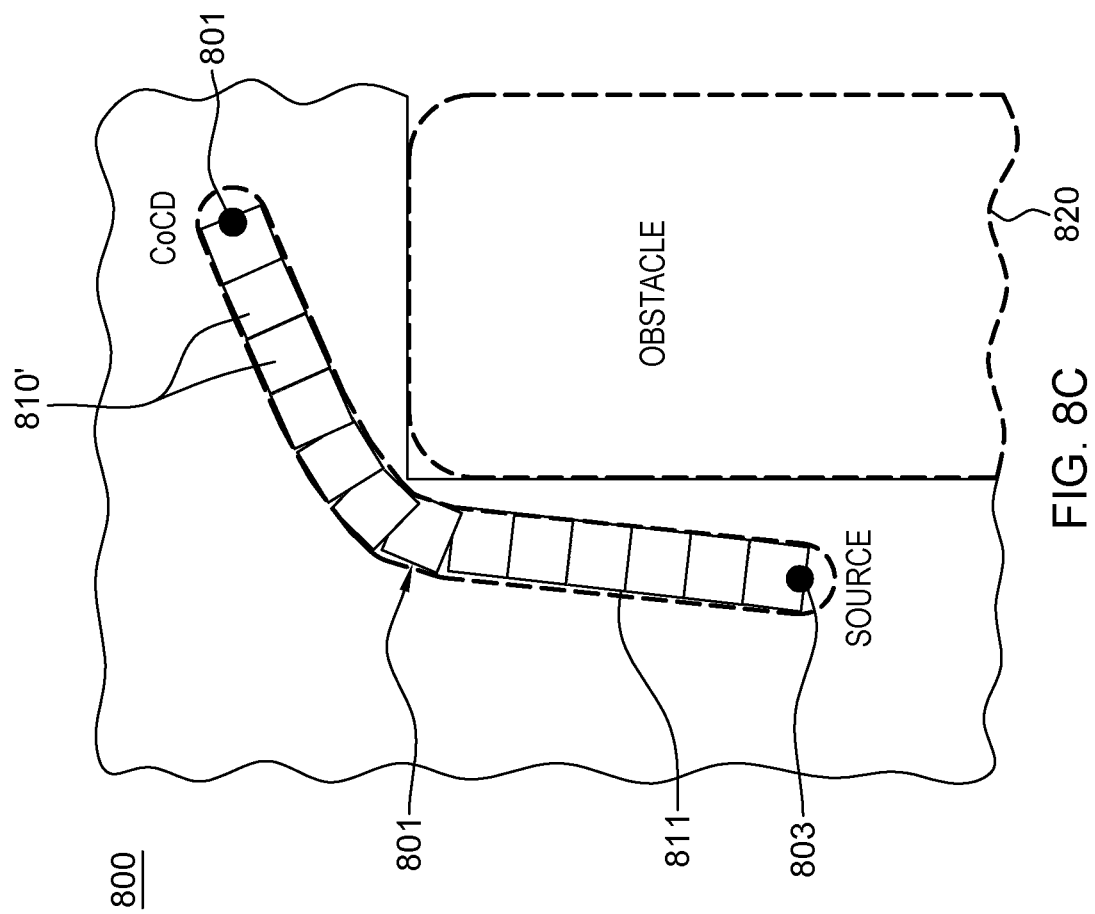

FIGS. 8A-8C depict another example of a circuit board 800 to be fabricated with a power plane sub-shape 801 being formed between a center of current density 802 and a source location 803. In the embodiment illustrated, circuit board 800 has, for instance, a void or other obstacle 820 that cannot be routed around in multiple paths. Using the values described above in connection with FIG. 7A, the resultant 13 rectangles 810 are shown placed in FIG. 8A from source location 803 extending towards center of current density 802, around obstacle 820. Due to the board edge, or obstacle 820, the original rectangle size determination does not reach the destination, and thus, additional rectangles are iteratively added by the processing of FIGS. 6A-6B, with the size being recalculated for each additional rectangle.

For instance, in one or more embodiments, a prediction is made that at least two additional rectangles are required. The new rectangle resistance is determined to accommodate the additional two rectangle prediction. The volume of 13 0.5 mΩ rectangles is then used to determine the total volume of 15 rectangles of lower resistance. All previously placed rectangles are adjusted to the newly determined size. An example of this is depicted in FIG. 8B, where one iteration was needed. However, if 15 rectangles were still insufficient to reach, in this embodiment, the center of current density, then another iteration would be required where the resistance of each rectangle would again decrease.

FIG. 8C depicts an alternate solution where the same number of rectangles as original predicted (13) can still be used, but the rectangle (or square) size is increased, while maintaining the same 0.5 mΩ drop per rectangle. In this example, the additional distance, that is the distance that the original prediction was short from the center of current density, is assumed to be 1.5 cm. Thus, the new distance from the source to the center of current density is 11.5 cm, and the rectangle side length for 13 rectangles is re-determined to be 0.885 cm per rectangle. This larger rectangle size is illustrated in the depiction of 8C, and is sufficient for the resultant envelope 811 to extend between the center of current density 802 and the source location 803, around obstacle 820.

Figure 9A:
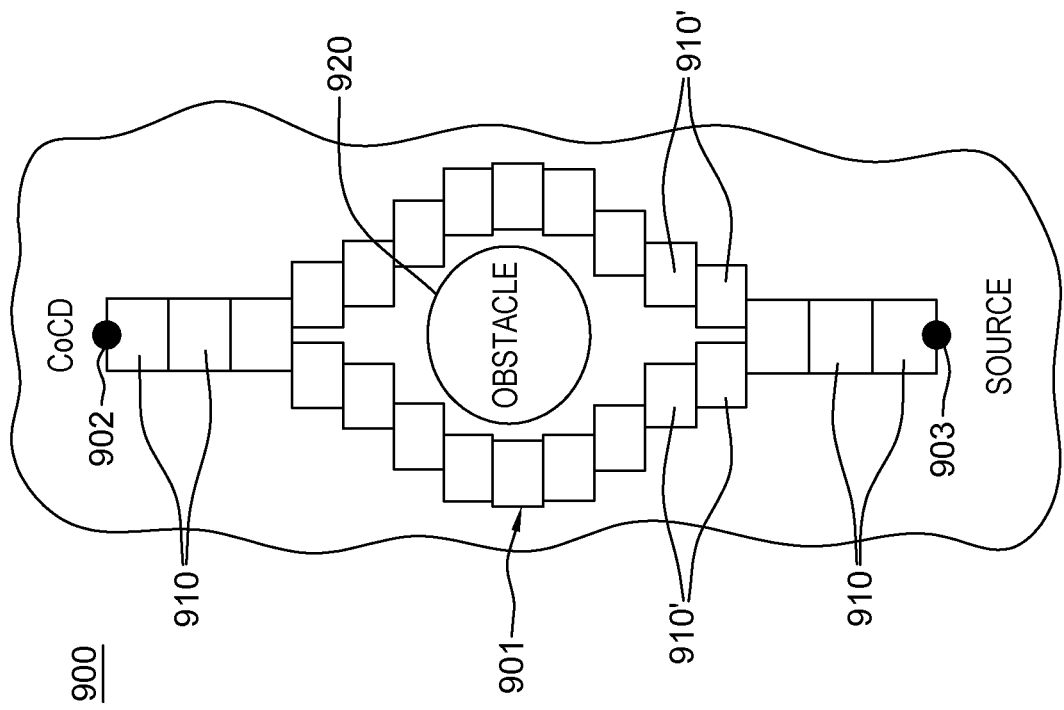
FIGS. 9A & 9B depict another example of incrementally generating a respective power plane sub-shape around a specified structure (or obstacle) of a circuit board, in accordance with one or more aspects of the present invention.
Figure 9B:
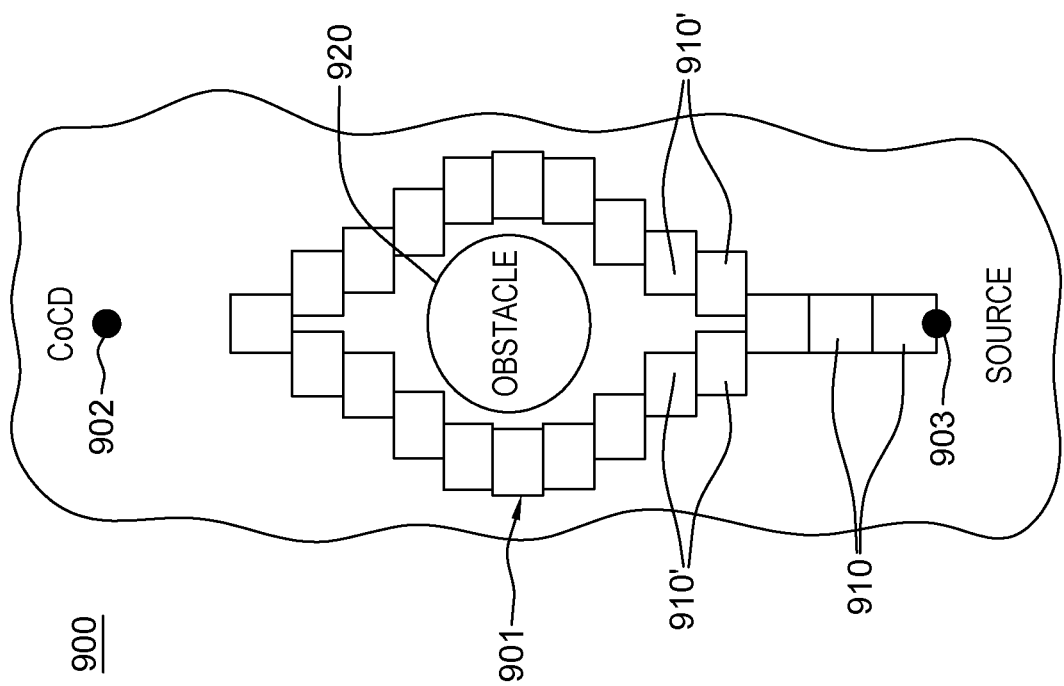

FIGS. 9A-9B depict another example of routing around an obstacle, in this case using multiple paths. The original copper thickness, resistance, current, voltage and maximum voltage drop is assumed the same as in FIGS. 7A-7B, with the power plane sub-shape 901 for circuit board 900 being constructed between center of current density 902 and a source location 903 (by way of example) using multiple rectangles 910, 910' to route around an obstacle 920. In this embodiment, smaller rectangle sizes 910' are needed when the paths split such that 50% of the current travels in the paths on each side of obstacle 920. The resistance for the split rectangles is set, in one or more embodiments, to 0.25 mΩ to divide the current evenly. With these assumptions, the volume for the reduced rectangle size can be determined as 0.000901 cm³, and the rectangle side lengths for the reduced sized rectangles can be determined by taking the square root of the volume divided by the layer thickness, which equals 0.5438 cm. In this example, note that each pair of 0.25 mΩ rectangles is equivalent to one 0.5 mΩ rectangle out of the original 13 required. In FIG. 9A, the power plane sub-shape is again short of connecting the full distance between the center of current density 902 and the source 903. In FIG. 9B, a prediction is made that at least two additional rectangles are required. The new rectangle resistance is determined to accommodate the additional two rectangle prediction. The volume of the 13 0.5 mΩ rectangles is then used to calculate the total volume of the 15 rectangles of lower resistance. All previously placed rectangles are adjusted to the newly determined size. In this example, one iteration is again only needed. However, if 15 rectangles were insufficient to span the distance, another iteration could be used where the resistance of each rectangle would again decrease.

Figure 9D:
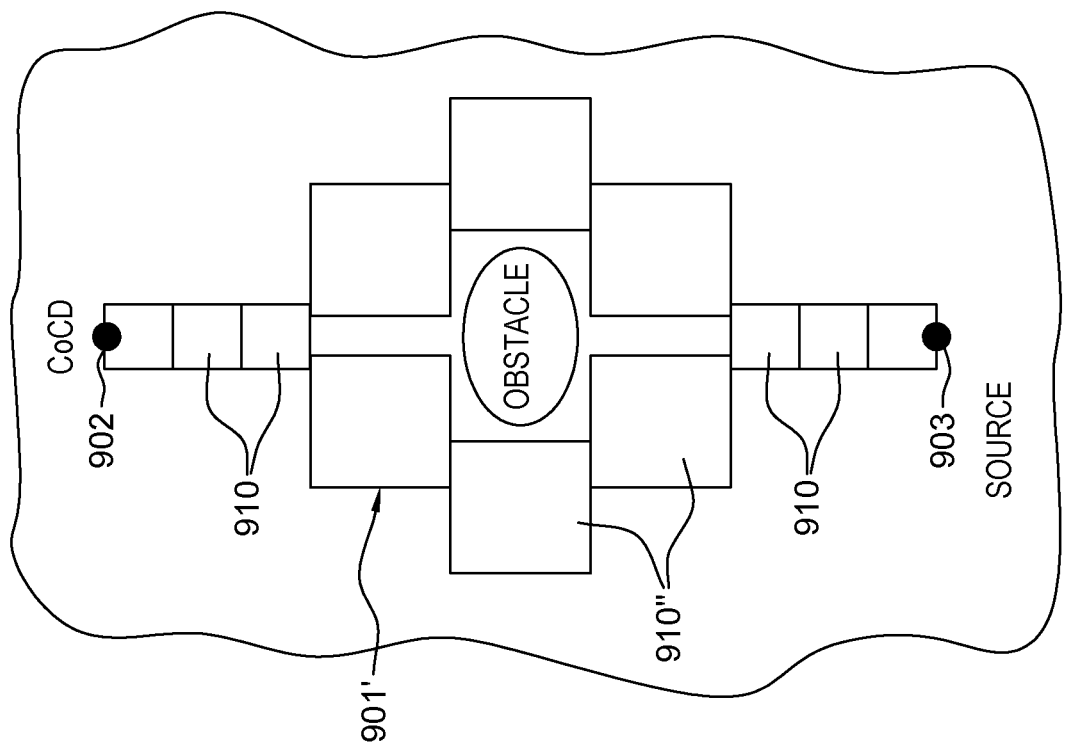
FIGS. 9C & 9D depict a further example of incrementally generating a respective power plane sub-shape around a specified structure (or obstacle) of a circuit board, in accordance with one or more aspects of the present invention.
Figure 9C:
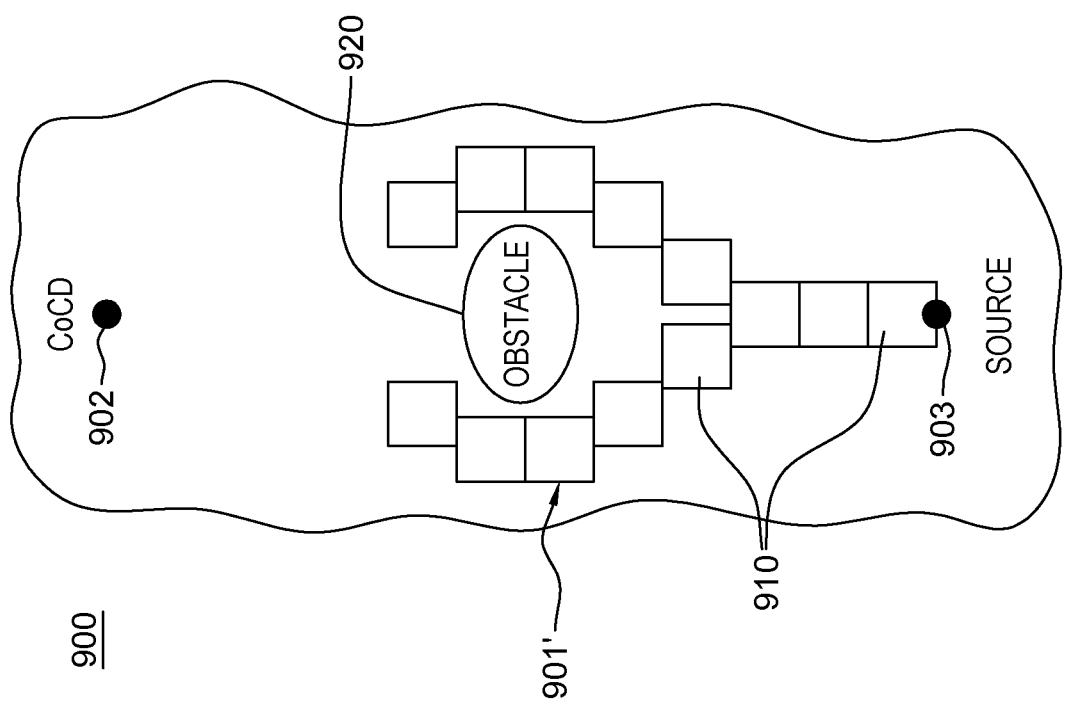

FIGS. 9C & 9D depict another example of routing around an obstacle using multiple paths, and logic, in accordance with one or more aspects of the present invention. This power plane sub-shape 901' is similar to power plane sub-shape 901 of FIGS. 9A-9B. However, in this embodiment, all rectangles are maintained at the 0.5 mΩ size to begin with, with the original prediction of 13 rectangles being short in FIG. 9C. Logic recognizes the distance for each path such that the correct size can be selected for each path while maintaining the same 0.5 mΩ drop per rectangle. For instance, the distance for the joint path may be the rectangle side length multiplied by the number of rectangles (or 0.769 cm×7 rectangles=5.383 cm in the example of FIG. 9D). Further, the distance for the split paths is equal to the distance between the center of current density and the source location (in this example) minus the distance of the joint path, which is 10 cm−5.383 cm=4.617 cm. The number of split rectangles equals the number of joint rectangles, minus the number of rectangles, resulting in 6 split rectangles. The side length of each split rectangle for a split path is then determined by multiplying the distance of the split paths times the number of paths divided by the number of rectangles. The result is that each rectangle may be 1.539 cm per side in the direction of current flow.

Those skilled in the art will note from the description provided herein that aspects disclosed herein provide improvement to the technical field of circuit board design and fabrication, as well as to improvements to the functioning of the resultant electronic device or system with which the circuit board is used. Further, aspects disclosed herein provide improvements to the functioning of the circuit board itself and, thus, to the functioning of the resultant electronic device or system. Aspects disclosed are inextricably tied to electronic device or system technology in that they relate specifically to design and fabrication of a circuit board used within an electronic device or system, such as a computer system. Advantageously, the aspects disclosed herein facilitate minimizing an amount of conductive material used to in the power plane layer of the circuit board by optimizing the power plane shape for power distribution within the printed circuit board. Further, aspects disclosed herein advantageously facilitate reducing the size of a printed circuit board by providing additional space within a power plane layer for, for instance, multiple power domains to be accommodated in the same layer, thus reducing the number layers of the printed circuit board, and thereby, reducing noise within the printed circuit board.

In one or more embodiments, the processing disclosed herein utilizes information about a printed circuit board layout, including size, shape, layer thickness, known obstacles, etc., as well as information about sources and sinks to create an optimized power shape and size, while meeting a desired voltage drop using, for instance, a plurality of copper rectangles or squares of known resistance, encompassed within an envelope. The process includes creating sub-shapes between each individual source/sink and a center of current density, and combing the sub-shapes to form the optimized power shape to deliver the proper voltage and current from the source(s) to the sink(s). The process includes routing the plurality of copper rectangles around any known obstacles and/or splitting the copper rectangles into multiple paths around an obstacle. In accordance with the processing described, optimally placed rectangles are provided of known resistance in order to minimize the overall power shape between a source/sink and the center of charge distribution, while ensuring sufficient current carrying capability to meet a desired voltage drop.

One example of a computer system that includes processors that may be used by one or more aspects of the present invention is described with reference to FIG. 10. In this example, the computer system is part of a computing environment including additional components that may or may not be used by aspects of the present invention.

Figure 10:
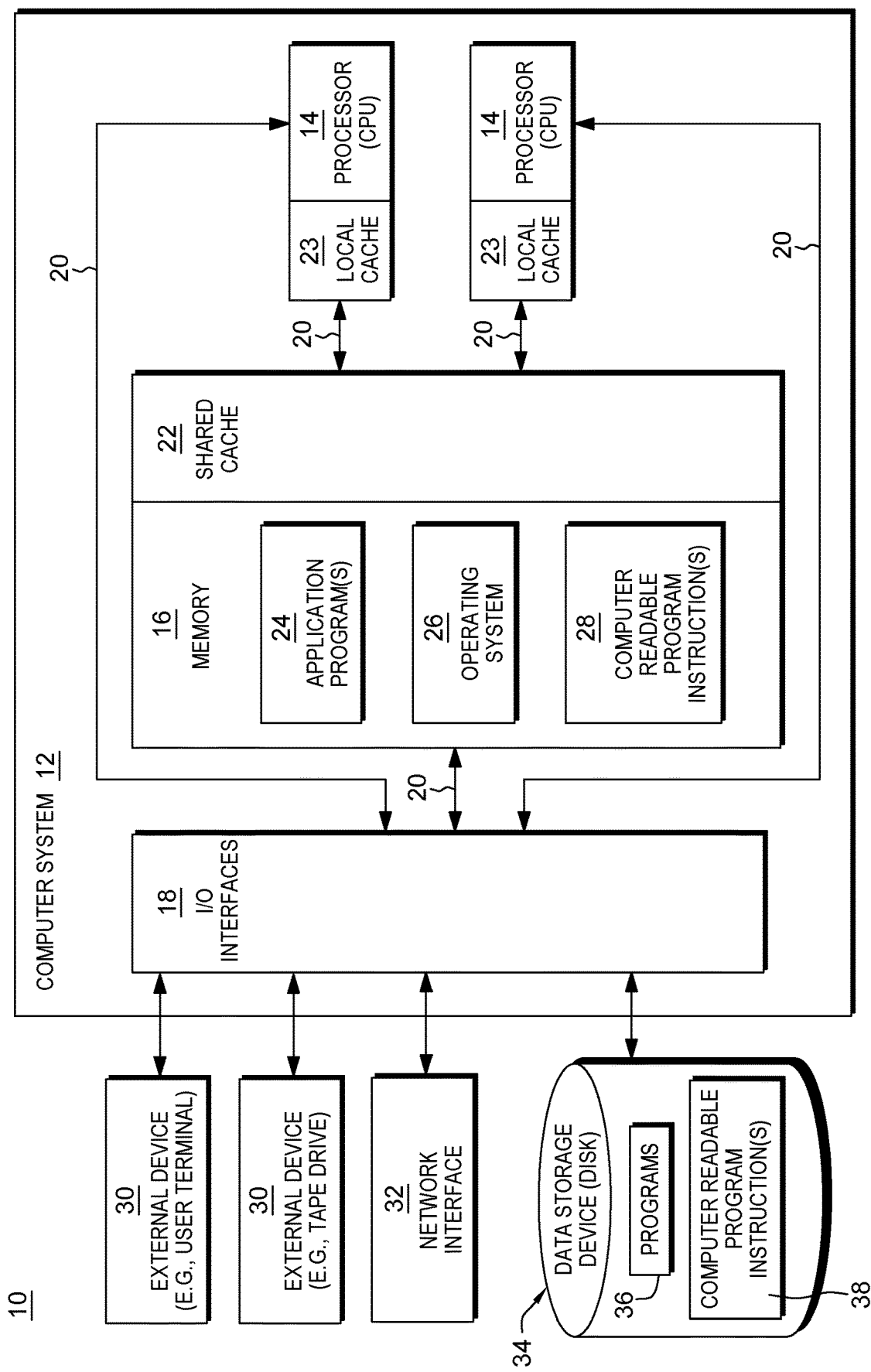
FIG. 10 depicts one embodiment of a computing system which may implement or facilitate implementing one or more design or control aspects associated with fabricating an optimized power plane shape within a circuit board, in accordance with one or more aspects of the present invention.

As shown in FIG. 10, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

In one example, the components may include an optimizing engine to determine an optimized power plane shape for a power plane of a circuit board; and a fabrication engine to facilitate initiating fabricating of the circuit board using, in part, the optimized power plane shape to provide the optimized power plane shape within the circuit board. The components executed by a processor may be individual components or combined in one component. Further, other components may be included to perform one or more other tasks. Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
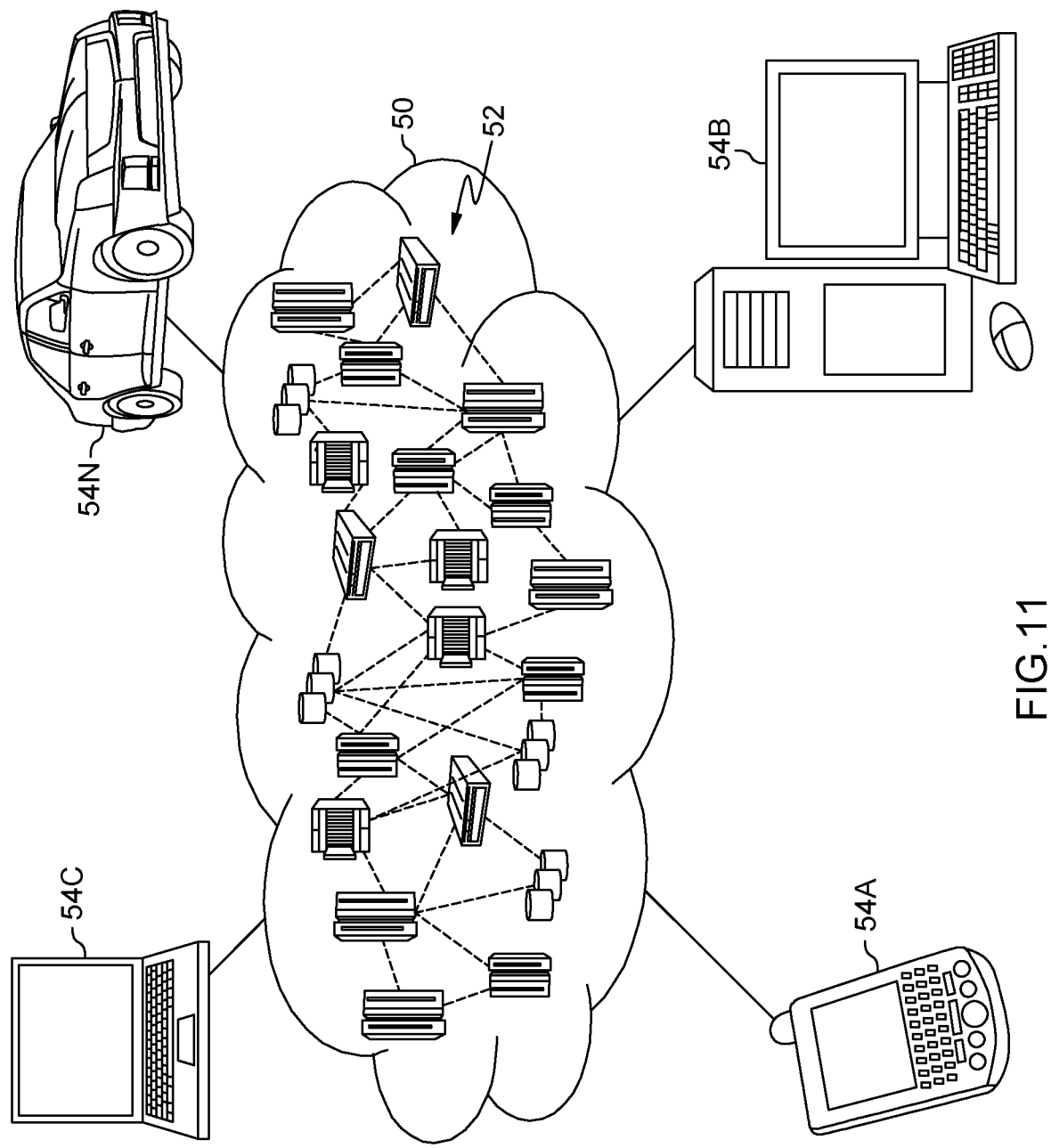
FIG. 11 depicts one embodiment of a cloud computing environment, which may implement, or be used in association with one or more aspects of the present invention.

Referring now to FIG. 11, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 12:
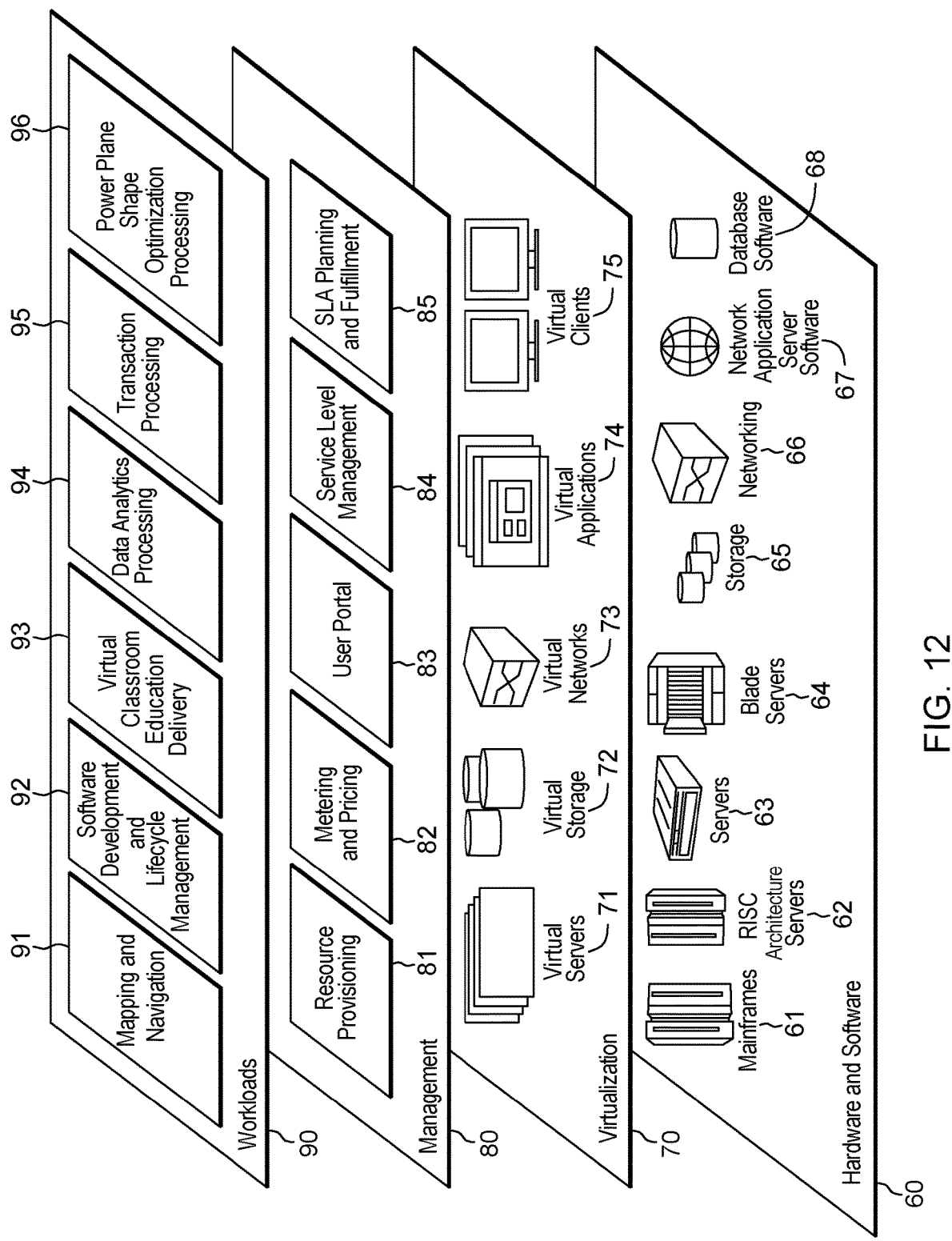
FIG. 12 depicts one example of abstraction model layers, which may facilitate or implement one or more aspects of fabricating an optimized power plane shape within a circuit board, in accordance with one or more aspects of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power plane shape optimization processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating fabricating a circuit board, the method comprising:
   automatically determining an optimized power plane shape for a power plane of the circuit board, the automatically determining comprising:
      ascertaining for the power plane at least one source location and at least one sink location, the at least one source location to supply power to the at least one sink location across the power plane;
      determining for the power plane a center of current density for the at least one source location to supply power to the at least one sink location;
      incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane;
      combining the respective power plane sub-shapes into the optimized power plane shape; and
   initiating fabricating of the circuit board using, at least in part, the optimized power plane shape to provide the optimized power plane shape within the circuit board.

2. The method of claim 1, wherein the incrementally generating comprises for a particular power plane sub-shape, incrementally laying out the power plane sub-shape as a plurality of interconnected conductive units of a particular geometric shape.

3. The method of claim 2, wherein the incrementally laying out comprises determining a number of conductive units of the particular geometric shape, and a size of the conductive units of the particular geometric shape based, at least in part, on a desired resistance for the respective power plane sub-shape.

4. The method of claim 3, wherein the determining the center of current density further comprises determining required voltage at the center of current density based on allowable voltage drop between the center of current density and the at least one sink location.

5. The method of claim 2, wherein incrementally generating the respective power plane sub-shapes comprises determining for a particular power-plane sub-shape that the power plane sub-shape would interfere with a specified structure of the circuit board, and based thereon, routing the particular power plane sub-shape around the specified structure by incrementally stepping the particular power plane sub-shape around the specified structure.

6. The method of claim 5, wherein routing the particular power plane sub-shape comprises splitting the power plane sub-shape into two power plane paths around opposite sides of the specified structure, and the incrementally generating comprises incrementally stepping each power plane path around a respective side of the specified structure of the circuit board.

7. The method of claim 2, wherein the number of conductive units of the particular geometric shape or the size of the conductive units of the particular geometric shape vary between different power plane sub-shapes based, in part, on location of one or more specified structures of the circuit board interfering with the incrementally generating of one or more of the different power plane sub-shapes.

8. The method of claim 2, wherein the particular geometric shape is a rectangle, and the optimized power plane shape provided during the fabricating is formed of copper.

9. The method of claim 1, wherein the combining comprises ascertaining an overlap volume between the respective power plane sub-shapes when combined, and using the overlap volume to curve one or more edges of the combined power plane sub-shapes to obtain the optimized power plane shape.

10. The method of claim 9, wherein using the overlap volume comprises curving the one or more edges of the combined power plane sub-shapes in a webbed pattern around the center of current density of the power plane.

11. A system for facilitating fabricating a circuit board, the system comprising:
    a memory; and
    a processor communicatively coupled to the memory, wherein the system performs a method comprising:
       automatically determining an optimized power plane shape for a power plane of the circuit board, the automatically determining comprising:
          ascertaining for the power plane at least one source location and at least one sink location, the at least one source location to supply power to the at least one sink location across the power plane;
          determining for the power plane a center of current density for the at least one source location to supply power to the at least one sink location;
          incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane;
          combining the respective power plane sub-shapes into the optimized power plane shape; and initiating fabricating of the circuit board using, at least in part, the optimized power plane shape to provide the optimized power plane shape within the circuit board.

12. The system of claim 11, wherein the incrementally generating comprises for a particular power plane sub-shape, incrementally laying out the power plane sub-shape as a plurality of interconnected conductive units of a particular geometric shape.

13. The system of claim 12, wherein the incrementally laying out comprises determining a number of conductive units of the particular geometric shape, and a size of the conductive units of the particular geometric shape based, at least in part, on a desired resistance for the respective power plane sub-shape.

14. The system of claim 13, wherein the determining the center of current density further comprises determining required voltage at the center of current density based on allowable voltage drop between the center of current density and the at least one sink location.

15. The system of claim 12, wherein incrementally generating the respective power plane sub-shapes comprises determining for a particular power-plane sub-shape that the power plane sub-shape would interfere with a specified structure of the circuit board, and based thereon, routing the particular power plane sub-shape around the specified structure by incrementally stepping the particular power plane sub-shape around the specified structure.

16. The system of claim 15, wherein routing the particular power plane sub-shape comprises splitting the power plane sub-shape into two power plane paths around opposite sides of the specified structure, and the incrementally generating comprises incrementally stepping each power plane path around a respective side of the specified structure of the circuit board.

17. The system of claim 12, wherein the number of conductive units of the particular geometric shape or the size of the conductive units of the particular geometric shape vary between different power plane sub-shapes based, in part, on location of one or more specified structures of the circuit board interfering with the incrementally generating of one or more of the different power plane sub-shapes.

18. The system of claim 11, wherein the combining comprises ascertaining an overlap volume between the respective power plane sub-shapes when combined, and using the overlap volume to curve one or more edges of the combined power plane sub-shapes to obtain the optimized power plane shape.

19. The system of claim 18, wherein using the overlap volume comprises curving the one or more edges of the combined power plane sub-shapes in a webbed pattern around the center of current density of the power plane.

20. A computer program product for facilitating fabricating of a circuit board, the computer program product comprising:
a computer readable storage medium having program instructions embodied therewith, the program instructions being executable by one or more computer systems, to cause the one or more computer systems to:
automatically determine an optimized power plane shape for a power plane of the circuit board, the automatically determining comprising:
ascertaining for the power plane at least one source location and at least one sink location, the at least one source location to supply power to the at least one sink location across the power plane;
determining for the power plane a center of current density for the at least one source location to supply power to the at least one sink location;
incrementally generating a respective power plane sub-shape between the center of current density and each source location of the at least one source location and between the center of current density and each sink location of the at least one sink location to, at least in part, supply a desired operational voltage from the at least one source location to the at least one sink location across the power plane;
combining the respective power plane sub-shapes into the optimized power plane shape; and
initiate fabricating of the circuit board using, at least in part, the optimized power plane shape to provide the optimized power plane shape within the circuit board.

* * * * *